United States Patent
Todokoro

(10) Patent No.: US 10,295,929 B1
(45) Date of Patent: May 21, 2019

(54) OPTICAL SCANNING DEVICE AND IMAGE FORMING APPARATUS INCLUDING THE SAME

(71) Applicant: KYOCERA Document Solutions Inc., Osaka (JP)

(72) Inventor: Ryotaro Todokoro, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/167,621

(22) Filed: Oct. 23, 2018

(30) Foreign Application Priority Data

Oct. 27, 2017 (JP) .................. 2017-208358

(51) Int. Cl.
  *G03G 15/00* (2006.01)
  *G03G 15/043* (2006.01)
  *G02B 26/12* (2006.01)
  *G02B 26/08* (2006.01)

(52) U.S. Cl.
  CPC ....... *G03G 15/043* (2013.01); *G02B 26/0816* (2013.01); *G02B 26/125* (2013.01); *G02B 26/127* (2013.01)

(58) Field of Classification Search
  CPC .......... G03G 15/04036; G03G 15/043; G03G 15/0409; G03G 15/5045
  USPC .......... 399/1–4, 32, 177, 220, 221; 358/237, 358/474
  See application file for complete search history.

(56) References Cited

U.S. PATENT DOCUMENTS 9,621,756 B2 * 4/2017 Todokoro ........... H04N 1/02481
2014/0210927 A1 * 7/2014 Hwang ................ H04N 1/0283
  347/118

FOREIGN PATENT DOCUMENTS

JP 2006-267701 10/2006
JP 2015031870 * 2/2015 ........... G03G 15/043

* cited by examiner

*Primary Examiner* — Hoan H Tran
(74) *Attorney, Agent, or Firm* — Wenderoth, Lind & Ponack, L.L.P.

(57) ABSTRACT

An optical scanning device includes a correction mechanism that rotates a synchronization detection mirror around a sub-scanning axis in accordance with a change in the temperature of a casing, wherein the correction mechanism includes a fixing support part provided to the casing and fixing the synchronization detection mirror thereto, and a first adhesive part and a second adhesive part respectively provided at one end side and the other end side of the synchronization detection mirror in a width direction perpendicular to a sub-scanning direction and serving as adhesives for allowing the synchronization detection mirror to adhere to the fixing support part. The correction mechanism is configured to rotate the synchronization detection mirror around the sub-scanning axis due to a difference between of thermal deformation amounts of the first adhesive part and the second adhesive part in a thickness direction when the temperature inside the casing has changed.

6 Claims, 11 Drawing Sheets

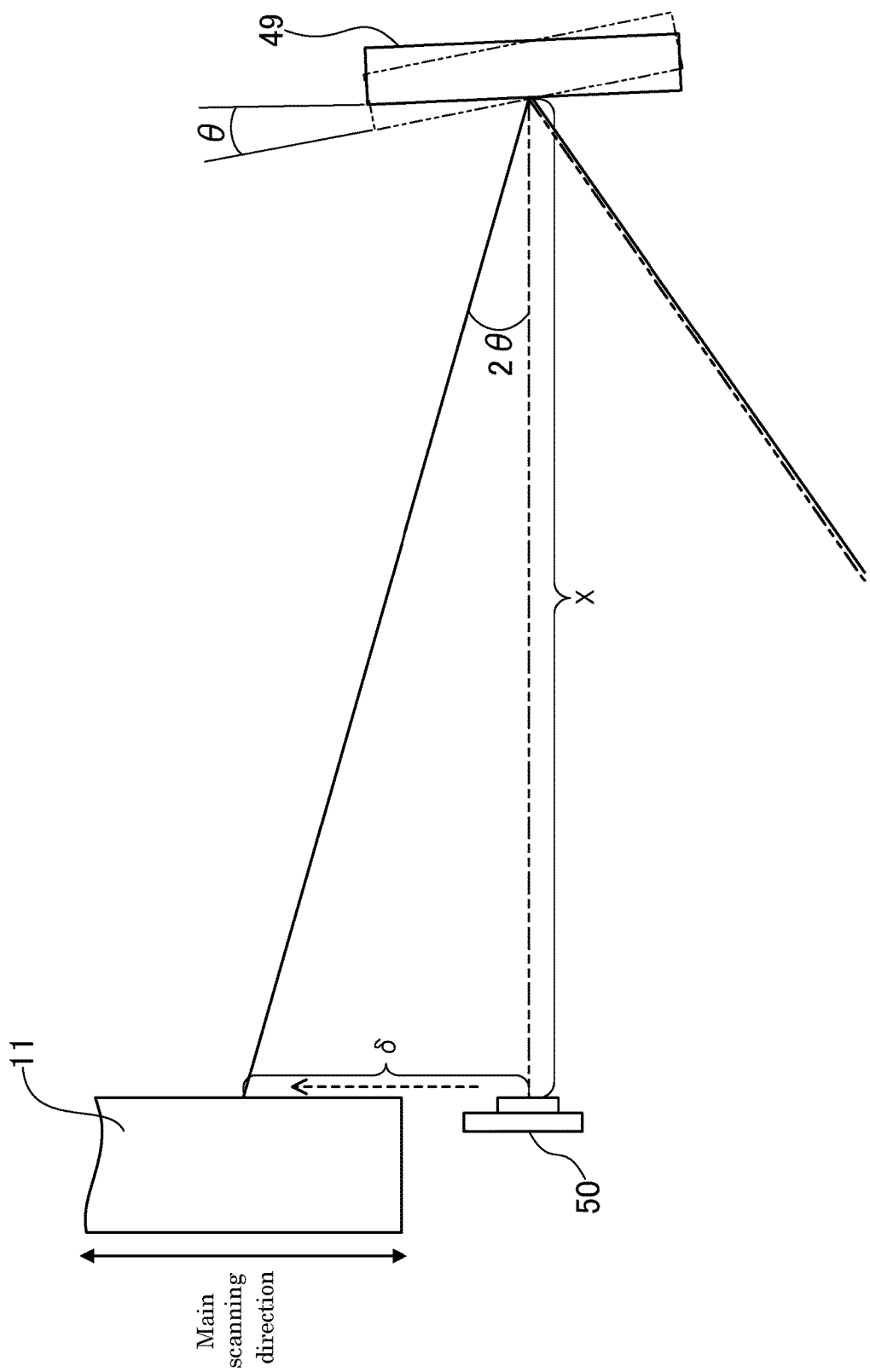

Main scanning direction

Main scanning direction

Main scanning direction

Main scanning direction

OPTICAL SCANNING DEVICE AND IMAGE FORMING APPARATUS INCLUDING THE SAME

CROSS-REFERENCE TO RELATED APPLICATION

This application is based upon and claims the benefit of priority from Japanese Patent Application No. 2017-208358 filed on Oct. 27, 2017, the entire contents of which are incorporated herein by reference.

BACKGROUND

The technology of the present disclosure relates to an optical scanning device and an image forming apparatus including the same.

In the related art, there has been known an optical scanning device mounted in an electrophotographic image forming apparatus. The optical scanning device emits light beams corresponding to image data at a predetermined writing timing and allows the light beams to be scanned on a surface of a photosensitive drum.

The optical scanning device includes a casing, a light source provided in the casing, a deflector that deflects light beams emitted from the light source and converts the light beams into scanning light, an image forming lens that allows an image of the scanning light from the deflector to be formed on a photosensitive drum, a synchronization detection mirror provided out of an effective scanning region (out of a scanning region for image formation) of the light beams having passed through the image forming lens, and a synchronization detection sensor that detects light beams reflected by the synchronization detection mirror.

The synchronization detection sensor detects the light beams and outputs a synchronization signal serving as a reference of a writing timing of image data toward a control unit. The control unit controls a writing timing of an image to the photosensitive drum based on a reception timing of the synchronization signal.

In such a type of optical scanning device, when the temperature inside the casing increases during its operation, position shift of the light beams in a main scanning direction occurs due to extension and contraction of the image forming lens, a change in a refractive index and the like. As a consequence, there is a problem that, for example, position shift of an image occurs in a monochromatic apparatus and color shift occurs in a color machine.

In order to solve such problems, there has been proposed an optical scanning device having a correction mechanism. The correction mechanism, for example, rotates the synchronization detection mirror in accordance with a change in the temperature inside the casing to adjust a light beam detection time by the synchronization detection sensor, and to correct shift of a writing position of the image data in the main scanning direction. The correction mechanism has a support member that supports one end part of a reflecting mirror so as to be rotatable, an extendable member that is extended and contracted by temperature and rotates the reflecting mirror about the support member, and an urging member that urges the reflecting mirror to the extendable member side.

SUMMARY

An optical scanning device according to one aspect of the present disclosure includes a casing, a light source, a deflector, a synchronization detection mirror, a synchronization detection sensor, a writing control unit, and a correction mechanism. The deflector is provided in the casing to deflect light beams emitted from the light source. The synchronization detection mirror reflects the light beams reflected from the deflector. The synchronization detection sensor outputs a synchronization signal when the light beams reflected by the synchronization detection mirror are incident. The writing control unit starts writing of image data by the light source when a predetermined time passes after the signal from the synchronization detection sensor is received. The correction mechanism rotates the synchronization detection mirror by a predetermined angle around a sub-scanning axis in accordance with a change in temperature inside the casing, thereby correcting position shift of a written image.

The correction mechanism includes a fixing support part and a first adhesive part and a second adhesive part. The fixing support part is provided to the casing. The synchronization detection mirror is fixed to the fixing support part. The first adhesive part and the second adhesive part are respectively provided at one end side and the other end side of the synchronization detection mirror in a width direction perpendicular to a sub-scanning direction. The first adhesive part and the second adhesive part include adhesives for allowing the synchronization detection mirror to adhere to the fixing support part. When the temperature inside the casing has changed, there is a difference between thermal deformation amounts of the first adhesive part and the second adhesive part in a thickness direction. The correction mechanism is configured to rotate the synchronization detection mirror around the sub-scanning axis due to the difference between the thermal deformation amounts.

BRIEF DESCRIPTION OF THE DRAWINGS

FIG. 7 is a schematic view illustrating a geometrical relation between a movement amount of light beams in a main scanning direction when an angle of a synchronization detection mirror has changed by θ and a distance from a synchronization detection sensor to a reflection point of the synchronization detection mirror.

DETAILED DESCRIPTION

Hereinafter, an example of an embodiment will be described in detail on the basis of the drawings. It is noted that the technology of the present disclosure is not limited to the following embodiments.

Embodiment

Figure 1:
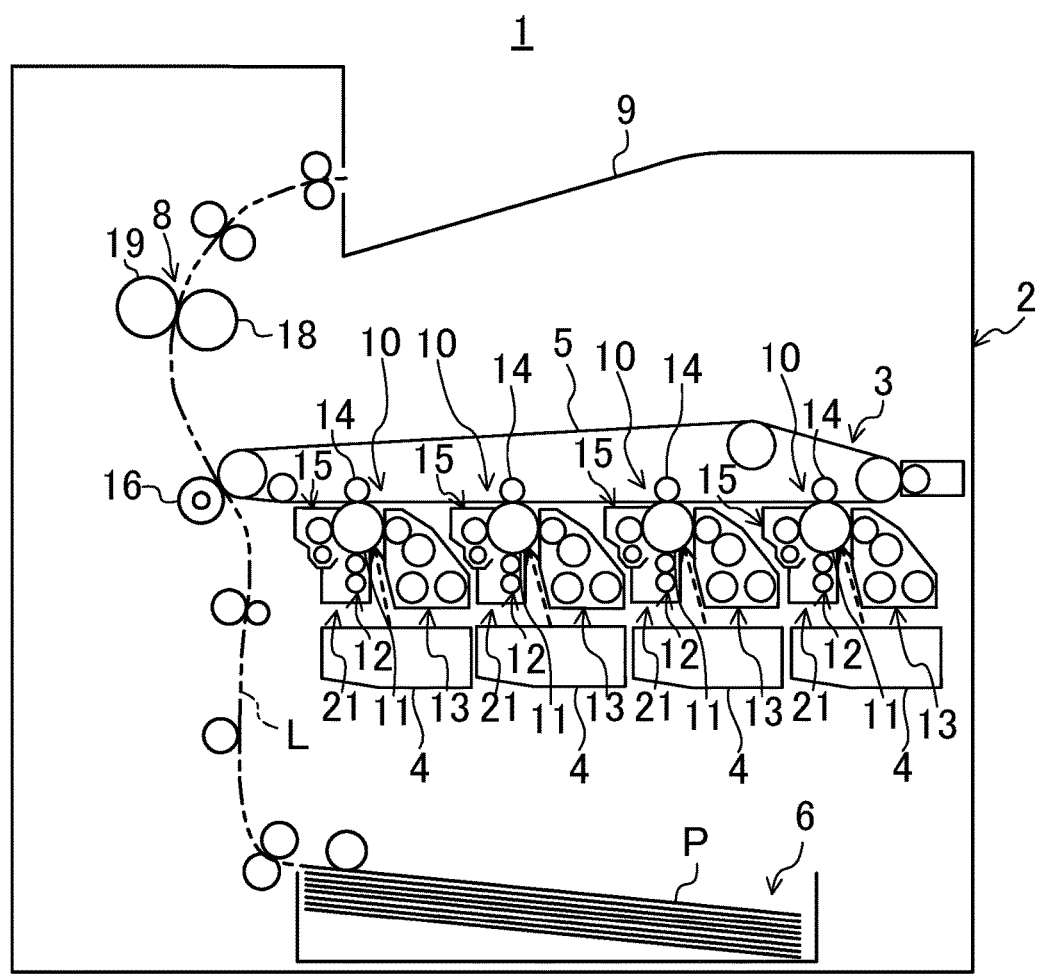
FIG. 1 is a schematic view of an image forming apparatus including an optical scanning device in an embodiment.

FIG. 1 is a schematic configuration illustrating an image forming apparatus 1 in the present embodiment. The image forming apparatus 1 is a tandem type color printer and has an image forming unit 3 in a box-like casing 2. The image forming unit 3 transfers an image to a sheet P and forms the image on the sheet P on the basis of image data transmitted from an external device such as a computer subjected to network connection and the like. Below the image forming unit 3, four optical scanning devices 4 are disposed to emit laser beams, and above the image forming unit 3, a transfer belt 5 is disposed. Below the optical scanning devices 4, a sheet storage unit 6 is disposed to store the sheet P. At a left upper side of the transfer belt 5, a fixing unit 8 is disposed to perform a fixing process on the image transferred to and formed on the sheet P. At an upper part of the casing 2, a sheet discharge unit 9 is formed to discharge the sheet P subjected to the fixing process in the fixing unit 8. The image forming apparatus 1 is provided therein with a sheet conveyance path L extending toward the sheet discharge unit 9 from the sheet storage unit 6.

The image forming unit 3 includes four image forming units 10 disposed in a row along the transfer belt 5. Below each of the image forming units 10, the optical scanning device 4 is disposed. Each of the image forming units 10 has a photosensitive drum 11. Directly under each photosensitive drum 11, a charging device 12 is disposed, and at a right side of each photosensitive drum 11, a developing device 13 is disposed. Directly above each photosensitive drum 11, a primary transfer roller 14 is disposed, and at a left side of each photosensitive drum 11, a cleaning unit 15 is disposed to clean the peripheral surface of the photosensitive drum 11.

The peripheral surface of each photosensitive drum 11 is constantly charged by the charging device 12, and laser beams corresponding to each color based on image data inputted from the computer and the like are irradiated to the charged peripheral surface of the photosensitive drum 11 from the optical scanning devices 4. As a consequence, an electrostatic latent image is formed on the peripheral surface of each photosensitive drum 11. A developer is supplied to the electrostatic latent image from the developing device 13, so that a toner image of yellow, magenta, cyan, or black is formed on the peripheral surface of each photosensitive drum 11. These toner images are respectively superposed on and transferred to the transfer belt 5 by a transfer bias applied to the primary transfer roller 14.

At the left side of the transfer belt 5, a secondary transfer roller 16 is disposed. The secondary transfer roller 16 is disposed in the state of abutting the transfer belt 5. The secondary transfer roller 16 interposes the sheet P conveyed from the sheet storage unit 6 along the sheet conveyance path L between the secondary transfer roller 16 and the transfer belt 5. A transfer bias is applied to the secondary transfer roller 16, so that the toner images on the transfer belt 5 are transferred to the sheet P by the applied transfer bias.

The fixing unit 8 includes a heating roller 18 and a pressure roller 19, wherein the sheet P is interposed by the heating roller 18 and the pressure roller 19 so as to be pressurized and heated. By so doing, the fixing unit 8 fixes the toner images, which have been transferred to the sheet P, to the sheet P. The sheet P subjected to the fixing process is discharged to the sheet discharge unit 9.

Next, with reference to FIG. 2, each optical scanning device 4 will be described in detail. Since the configurations of the optical scanning devices 4 are identical to one another, only one of the optical scanning devices 4 will be described and the other optical scanning devices 4 will not be described.

The optical scanning device 4 has a sealed casing 40. The casing 40 has a bottom wall part 41, a side wall part 42 upright from a peripheral edge of the bottom wall part 41 in a sub-scanning direction, and a lid (not illustrated).

The side wall part 42 of the casing 40, for example, is provided with a light source 43 including a laser diode (LD) and the like. The light source 43 is installed at a board 44 mounted on the outside surface of the side wall part 42.

In the casing 40, a collimator lens (not illustrated), a cylindrical lens 45, and a polygon mirror 46 as a deflector are disposed on a straight line along an emission direction of light beams emitted from the light source 43. At a lateral side of the polygon mirror 46, a first image forming lens 48a and a second image forming lens 48b are disposed spaced apart from each other in a radial direction, wherein at a lateral side of the second image forming lens 48b, a return mirror 47 is disposed. The first image forming lens 48a and the second image forming lens 48b, for example, are fθ lenses. A constituting material of the first image forming lens 48a and the second image forming lens 48b is a resin material in the present embodiment; however, the constituting material is not limited thereto and may be a glass and the like.

The polygon mirror 46 is a polygonal rotation mirror having a plurality of reflecting surfaces on the peripheral surface thereof. The polygon mirror 46 reflects (deflects) the light beams emitted from the light source 43 and allows the light beams to be scanned in a main scanning direction. The first image forming lens 48a and the second image forming lens 48b perform equal speed conversion for the light beams deflected and scanned by the polygon mirror 46. The return mirror 47 reflects the light beams having passed through the second image forming lens 48b and leads the reflected light beams to the peripheral surface of the photosensitive drum 11.

The casing 40 is further provided with a synchronization detection mirror 49, a synchronization detection sensor 50, and a sensor board 51 mounted with the synchronization detection sensor 50.

The synchronization detection mirror 49 is fixed and supported from its rear surface side (an opposite side of a reflecting surface) by a pair of fixing pieces 61, 62 (corresponding to fixing support parts) upright from the bottom wall part of the casing 40. Details of the fixing structure of the synchronization detection mirror 49 by the pair of fixing pieces 61, 62 will be described later.

The synchronization detection mirror 49 reflects the light beams deflected by the polygon mirror 46 and traveled along an optical path out of an effective scanning range (a range in which image data is actually written), and allows the reflected light beams to be incident on the synchronization detection sensor 50. The light beams deflected by the polygon mirror 46 and traveling along an optical path in the effective scanning range scan and expose the peripheral surface of the photosensitive drum 11 in an axial direction (the main scanning direction).

The synchronization detection sensor 50 is mounted on the sensor board 51 vertically fixed to the bottom wall part 41 of the casing 40. The synchronization detection sensor 50, for example, is configured by a photodiode, a phototransistor, a photo IC and the like. The synchronization detection sensor 50 outputs a synchronization signal when the light beams have passed through a detection surface (not illustrated) of the synchronization detection sensor 50. The detection signal outputted from the synchronization detection sensor 50 is transmitted to a controller 100 to be described later.

Figure 3:
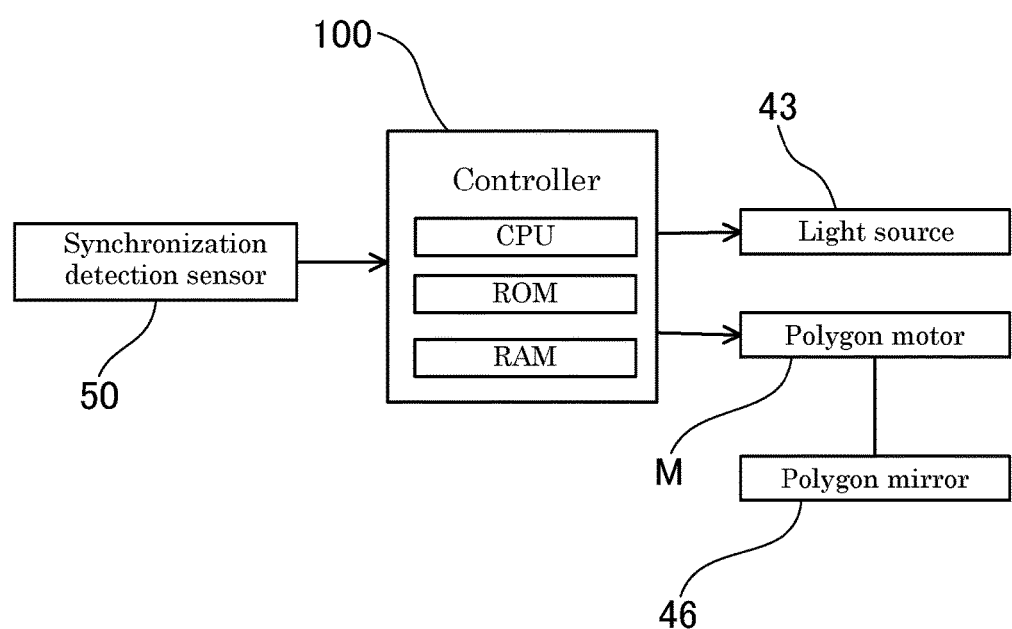
FIG. 3 is a block diagram illustrating a part of a control system of an image forming apparatus.

As illustrated in FIG. 3, the controller (a writing control unit) 100 includes a microcomputer having a CPU, a ROM, a RAM and the like. The controller 100 starts writing of image data to the photosensitive drum 11 by the light source 43 when a predetermined time has passed after the reception of the synchronization signal outputted from the synchronization detection sensor 50. By so doing, the controller 100 controls a writing start position of the image data for each color such that color shift of an image does not occur.

When the optical scanning device 4 functions, if the temperature inside the casing 40 is changed due to heat generation of a polygon motor M and the like, thermal deformation occurs in the casing 40 or the first image forming lens 48a. As a consequence, since variation occurs in the detection timing of light beams by the synchronization detection sensor 50, color shift of an image may occur. In order to solve such a problem, the optical scanning device 4 of the present embodiment includes a correction mechanism 60 for color shift correction.

The correction mechanism 60 rotates the synchronization detection mirror 49 by a predetermined angle around a sub-scanning axis (an axis extending in the sub-scanning direction) in accordance with a change in the temperature inside the casing 40, thereby suppressing the variation in the detection timing of the light beams by the synchronization detection sensor 50.

Figure 2:
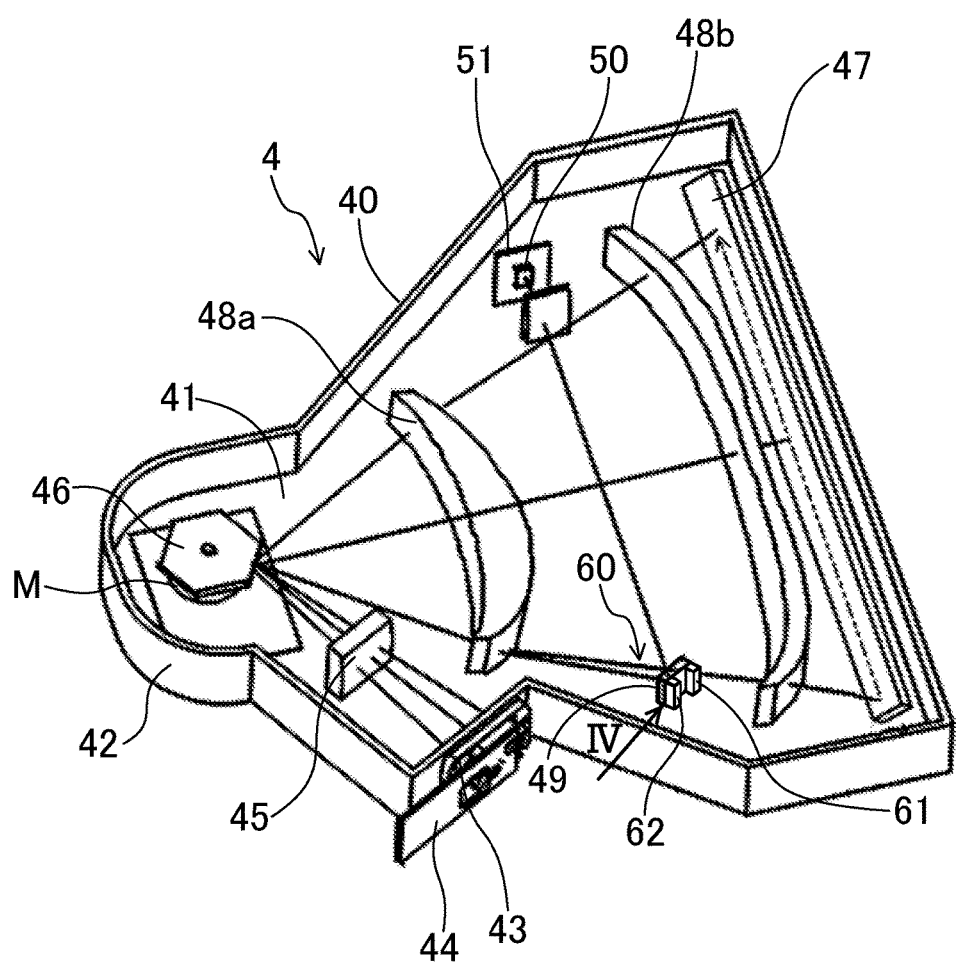
FIG. 2 is a perspective view illustrating a state in which a lid member has been removed from an optical scanning device.
Figure 4:
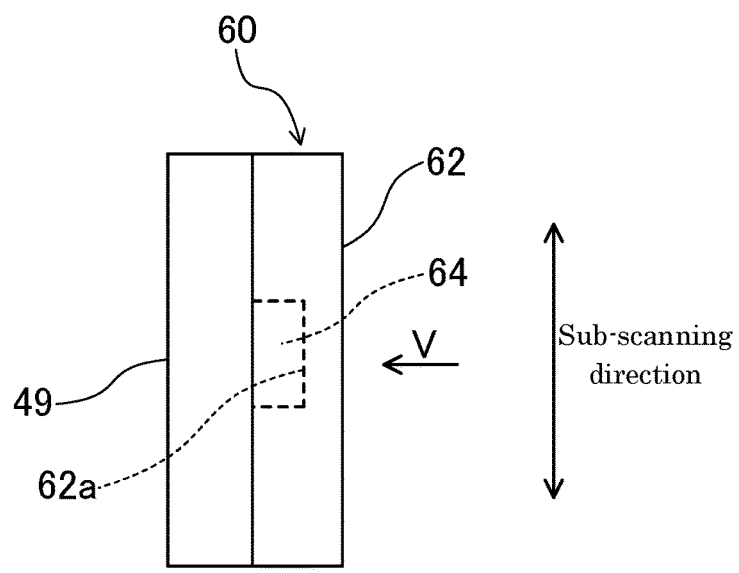
FIG. 4 is a view viewed from the arrow direction of IV of FIG. 2.
Figure 5:
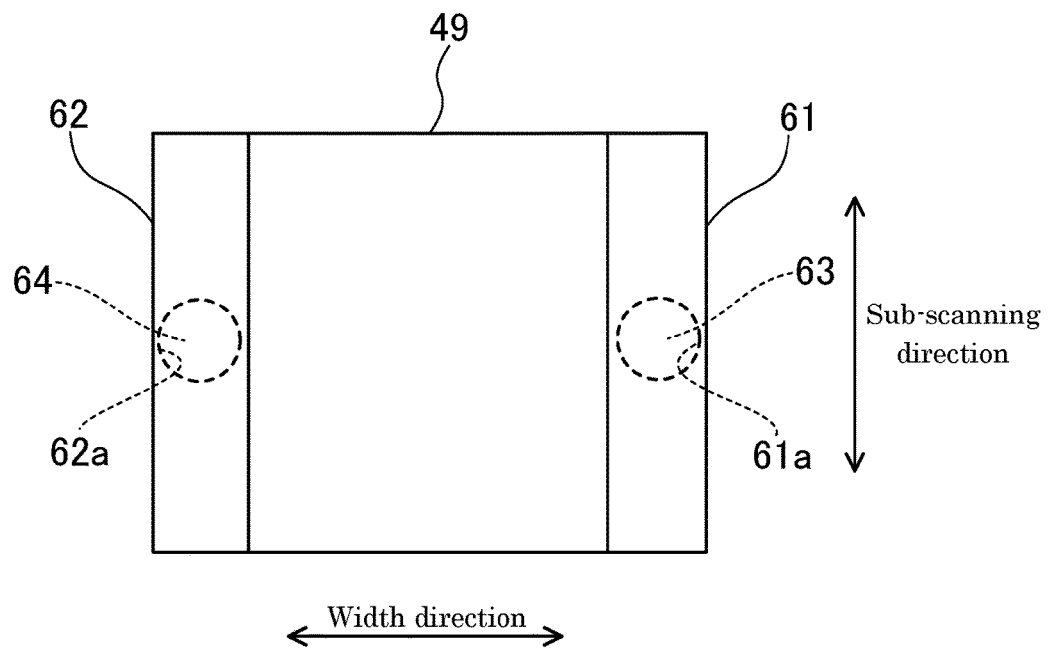
FIG. 5 is a view viewed from the arrow direction of V of FIG. 4.

With reference to FIG. 2, FIG. 4, and FIG. 5, details of the correction mechanism 60 will be described. The correction mechanism 60 has a pair of first fixing piece 61 and second fixing piece 62 vertically installed on the bottom wall part 41 of the casing 40, and a first adhesive part 63 and a second adhesive part 64 that adhere and fix the synchronization detection mirror 49 to the fixing pieces 61, 62, respectively.

The first fixing piece 61 and the second fixing piece 62 have a square columnar shape and are vertically installed at the bottom wall part 41 of the casing 40 while being spaced apart from each other. Furthermore, the first fixing piece 61 and the second fixing piece 62 fix and support the synchronization detection mirror 49 from the rear surface side (the opposite side of the reflecting surface). The first fixing piece 61 and the second fixing piece 62 abut both end parts of a rear surface of the synchronization detection mirror 49 in a width direction perpendicular to the sub-scanning direction. In the present embodiment, the first fixing piece 61 and the second fixing piece 62 are integrally formed with the bottom wall part 41 of the casing 40. The first fixing piece 61 and the second fixing piece 62 may be configured with a member separate from the casing 40 such that they are hardly affected by thermal deformation of the casing 40.

The first fixing piece 61 and the second fixing piece 62 are respectively formed on the surfaces thereof, which face the synchronization detection mirror 49 side, with a first adhesive holding hole 61a and a second adhesive holding hole 62a having a bottomed cylindrical shape. The adhesive holding holes 61a, 62a are filled with a liquid adhesive. The first and second adhesive parts 63 and 64 are respectively formed by solidifying an adhesive in the adhesive holding holes 61a, 62a. The first and second adhesive parts 63 and 64 are configured by a resin material. The first and second adhesive parts 63 and 64 are provided at the center part of the rear surface of the synchronization detection mirror 49 in the sub-scanning direction.

The first adhesive part 63 and the second adhesive part 64 are extended and contracted in accordance with a change in the temperature inside the casing 40, thereby rotating the synchronization detection mirror 49 around the sub-scanning axis.

Figure 6A:
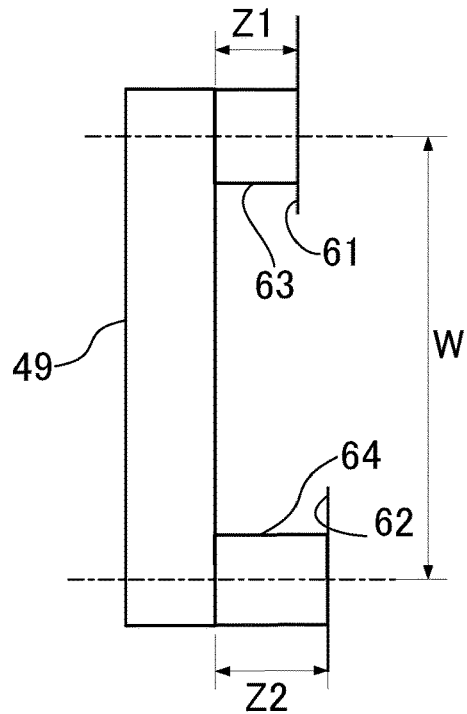
FIG. 6A is an explanation view for explaining a correction principle of a rotation angle of a synchronization detection mirror due to thermal deformation of a first adhesive part and a second adhesive part.
Figure 6B:
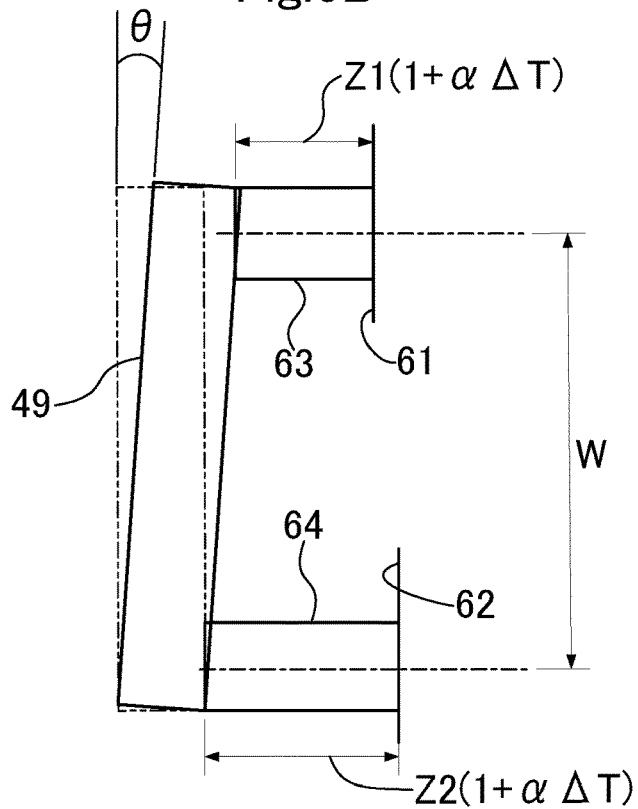
FIG. 6B is an explanation view for explaining a correction principle of a rotation angle of a synchronization detection mirror due to thermal deformation of a first adhesive part and a second adhesive part.

FIG. 6A and FIG. 6B are explanation views for explaining a correction principle of a rotation angle of the synchronization detection mirror 49 due to the extension and contraction of the first adhesive part 63 and the second adhesive part 64. FIG. 6A illustrates a case where the temperature inside the casing 40 is a predetermined temperature. In this state, a thickness (a length in an axis direction of the adhesive holding hole 61a) of the first adhesive part 63 is Z1 and a thickness (a length in an axis direction of the adhesive holding hole 62a) of the second adhesive part 64 is Z2. When the temperature inside the casing 40 is increased by ΔT from this state, the first adhesive part and the second adhesive part 64 are extended by thermal deformation as illustrated in FIG. 6B. In this case, the thickness of the first adhesive part 63 can be indicated by Z1 (1+αΔT) and the thickness of the second adhesive part 64 can be indicated by Z2 (1+αΔT). The α is a linear expansion coefficient of the first adhesive part 63 and the second adhesive part 64. In the present embodiment, the linear expansion coefficients of the first adhesive part 63 and the second adhesive part 64 are identical to each other; however, the linear expansion coefficients may be different from each other.

By so doing, the first adhesive part 63 and the second adhesive part 64 are extended, so that the synchronization detection mirror 49 rotates by θ around the sub-scanning axis (an axis extending in a direction perpendicular to the sheet surface of FIG. 6B). The θ satisfies a relation of the following Equation (1) when an interval between the first adhesive part 63 and the second adhesive part 64 is set to W.

$$\theta = \arctan((Z2-Z1) \times (1+\alpha\Delta T))/W \quad (1)$$

According to Equation (1) above, when the interval W between the first adhesive part 63 and the second adhesive part 64 and the thicknesses Z1, Z2 are appropriately set, it can be understood that it is possible to adjust the rotation angle θ of the synchronization detection mirror 49.

FIG. 7 is an explanation view for explaining a setting method of the thicknesses Z1, Z2 and the interval W, and is a view when the optical path of the optical scanning device 4 is viewed from the sub-scanning direction. A two dot chain line of FIG. 7 indicates a state (that is, a state before temperature increase) immediately after the optical scanning device 4 functions, and a solid line indicates a state in which the correction mechanism 60 has functioned by an increase in the temperature inside the casing 40 and thus the synchronization detection mirror 49 has rotated by the angle θ around the sub-scanning axis. In FIG. 7, δ indicates a position change amount of light beams in the main scanning direction when the synchronization detection mirror 49 has rotated by the angle θ, and X indicates a distance from the reflecting surface of the synchronization detection mirror 49 to the detection surface of the synchronization detection sensor 50. As illustrated in FIG. 7, when the synchronization detection mirror 49 has rotated by θ, since an angle of reflected light by the synchronization detection mirror 49 is changed by 2θ, the angle θ, the distance X, and the movement amount δ geometrically satisfy a relation of the following Equation (2).

$$\delta/X = \tan(2\theta) \quad (2)$$

Consequently, by Equation (1) and Equation (2) above, the position change amount of the light beams in the main scanning direction is expressed by the following Equation (3).

$$\delta = X \tan(2 \arctan((Z2-Z1) \times (1+\alpha\Delta T))/W) \quad (3)$$

When the position change amount of the light beams in the main scanning direction is YΔT, it is sufficient if the thicknesses Z1, Z2 and the interval W are set such that a relation of YΔT=δ is satisfied (that is, a relation of the following Equation (4) is satisfied).

$$Y\Delta T = X \tan(2 \arctan((Z2-Z1) \times (1+\alpha\Delta T))/W) \quad (4)$$

In Equation (4) above, the Y is a parameter indicating a position shift amount of the light beams in the main scanning direction when unit temperature is changed, and is a unique parameter decided by materials, dimensions and the like of the casing 40 and the image forming lenses 48a, 48b of the optical scanning device 4. The parameter Y can be obtained by performing test printing and the like in advance. When the thicknesses Z1, Z2 and the width W are decided, it is sufficient if the temperature change amount ΔT of the casing 40 in a normal operation of the optical scanning device 4 is predicted and the predicted change amount is put into Equation (4) above, such that the relation of Equation (4) above after the thicknesses Z1, Z2 and the interval W are substituted into is satisfied.

Figure 8A:
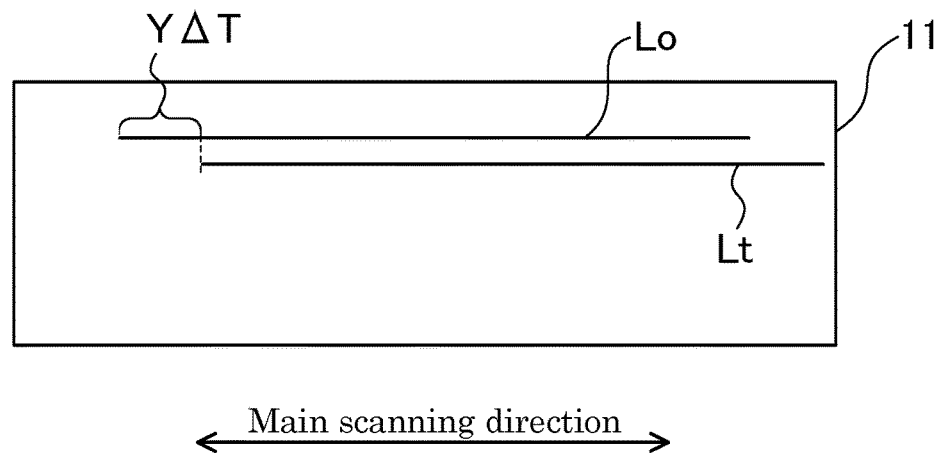
FIG. 8A is an explanation view illustrating a scanning position of light beams on a surface of a photosensitive drum, and illustrates an example of a case using a conventional optical scanning device having no correction mechanism.
Figure 8B:
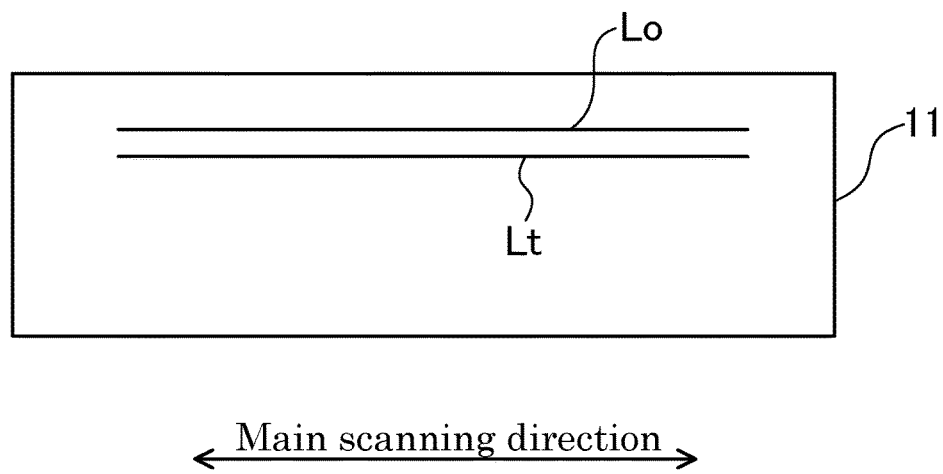
FIG. 8B is a view corresponding to FIG. 8A when using an optical scanning device of the present embodiment, which has a correction mechanism.

Next, with reference to FIG. 8A and FIG. 8B, a mode, in which the correction mechanism 60 functions to solve the position shift of the light beams in the main scanning direction, will be described. FIG. 8A is a view corresponding to the conventional optical scanning device having no correction mechanism 60, and FIG. 8B is a view corresponding to the optical scanning device 4 of the present embodiment, which has the correction mechanism 60. In FIG. 8A and FIG. 8B, Lo indicates a scanning line of light beams on the surface of the photosensitive drum 11 before temperature increase, and Lt indicates a scanning line of light beams on the surface of the photosensitive drum 11 when temperature has increased by ΔT. In the optical scanning device 4 according to such an example, when the correction mechanism 60 is not provided, a scanning start position of the light beams are delayed by YΔT due to the temperature increase (see FIG. 8A). Consequently, the synchronization detection mirror 49 is rotated by an angle θ in a clockwise direction in the plan view, so that the detection timing of the light beams by the synchronization detection sensor 50 is advanced, thereby solving the position shift of the light beams in the main scanning direction due to the temperature increase as illustrated in FIG. 8B.

As described above, according to the optical scanning device 4 of the present embodiment, the correction mechanism 60 has the first fixing piece 61 and the second fixing piece (fixing support parts) provided to the casing 40 and fixing the synchronization detection mirror 49 thereto, and the first adhesive part 63 and the second adhesive part 64 respectively provided at one end side and the other end side of the synchronization detection mirror 49 in the width direction perpendicular to the sub-scanning direction and serving as adhesives for allowing the synchronization detection mirror 49 to adhere to the first fixing piece 61 and the second fixing piece 62. Furthermore, the correction mechanism 60 is configured to rotate the synchronization detection mirror 49 around the sub-scanning axis due to a difference between thermal deformation amounts of the first adhesive part 63 and the second adhesive part 64 in the thickness direction when the temperature inside the casing 40 has changed.

According to such a configuration, it is possible to reduce the number of parts by simplifying the structure of the correction mechanism 60. Accordingly, it is possible to reduce the product cost.

Furthermore, in the present embodiment, the first adhesive part 63 and the second adhesive part 64 are respectively provided at one side end part and the other end part of the synchronization detection mirror 49 in the width direction.

According to such a configuration, it is possible to efficiently convert a difference between the thermal deformation amounts of the first adhesive part 63 and the second adhesive part 64 in the thickness direction into rotation displacement of the synchronization detection mirror 49.

Furthermore, the first adhesive part 63 and the second adhesive part 64 are provided at the center part of the synchronization detection mirror 49 in the width direction.

According to this, the synchronization detection mirror can be rotated at a stable orientation by the first adhesive part 63 and the second adhesive part 64.

Furthermore, the thickness Z1 of the first adhesive part 63, the thickness Z2 of the second adhesive part 64, and a distance W between the centers of the first adhesive part 63 and the second adhesive part 64 are set to satisfy Equation 4 above.

In this way, it is possible to prevent a variation in the detection timing of the light beams by the synchronization detection sensor 50 due to a change in the temperature inside the casing 40, so that it is possible to prevent position shift of a written image on the surface of the photosensitive drum 11 in the main scanning direction.

Modification Example 1

Figure 9:
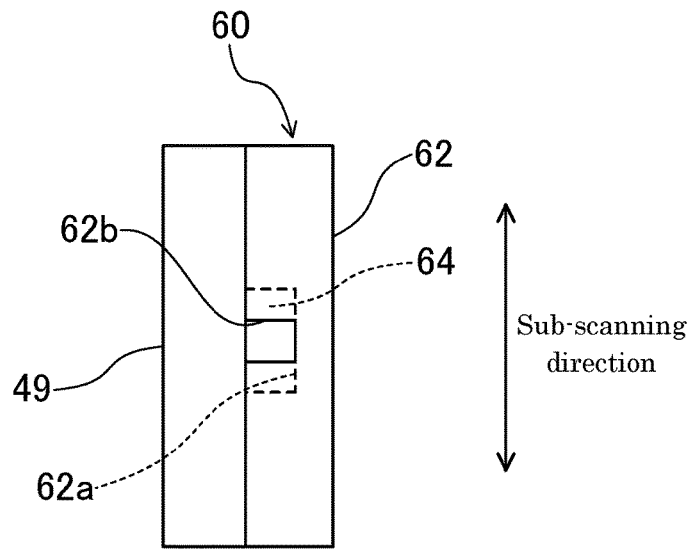
FIG. 9 is a view corresponding to FIG. 4, which illustrates a modification example 1.
Figure 10:
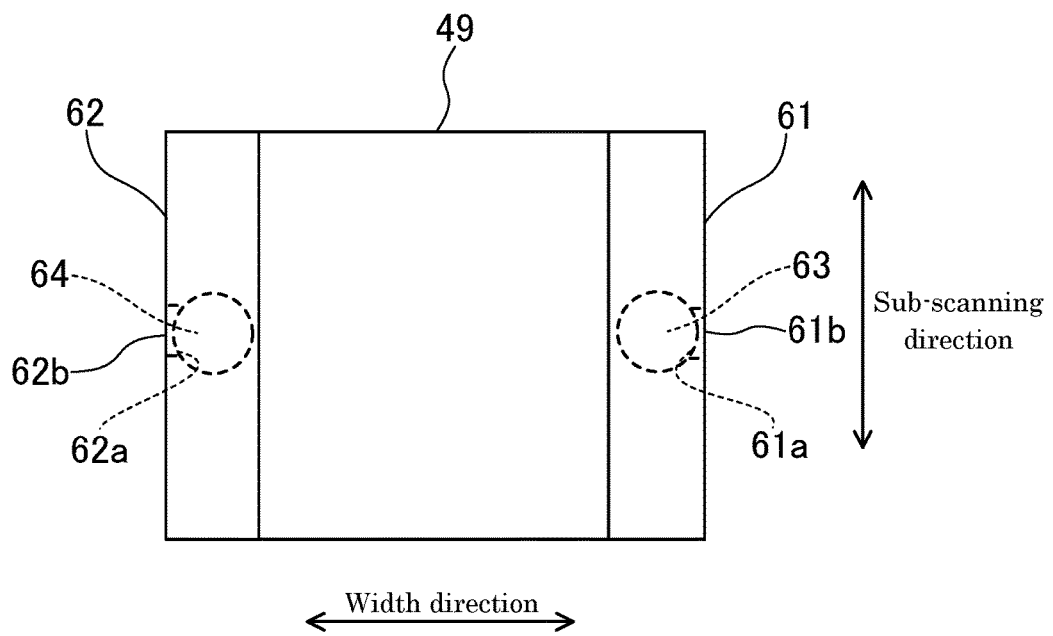
FIG. 10 is a view corresponding to FIG. 5, which illustrates a modification example 1.

FIG. 9 and FIG. 10 illustrate a modification example 1 of the present embodiment. In this modification example, the shapes of the sidewall surfaces of the first and second adhesive holding holes 61a, 62a are different from those of the aforementioned embodiment. In FIG. 9 and FIG. 10, the same reference numerals are used to designate the same elements as those of FIG. 4 and FIG. 5 and a detailed description thereof will be omitted.

That is, in the present modification example, the first and second adhesive holding holes 61a, 62a are formed on the sidewall surfaces thereof with openings 61b, 62b, respectively. The openings 61b, 62b are formed by cutting off parts in a circumferential direction of the first and second adhesive holding holes 61a, 62a. The openings 61b 62b allow the parts in the circumferential direction of the adhesive holding holes 61a, 62a to be opened at a radial outside.

According to such a configuration, when the synchronization detection mirror 49 is adhered and fixed to the first fixing piece 61 and the second fixing piece 62, adhesives excessively filled in the adhesive holding holes 61a, 62a can be released outside of the openings 61b, 62b. Thus, it is possible to precisely match the thicknesses Z1, Z2 of the first adhesive part 63 and the second adhesive part 64 to setting values (which is hole depths of the adhesive holding holes 61a, 62a).

When the openings 61b, 62b are too large, the first adhesive part 63 and the second adhesive part 64 are also deformed to the sides of the openings 61b, 62b when there is a change in the temperature inside the casing 40. As a consequence, there is a case where deformation amounts of the first adhesive part 63 and the second adhesive part 64 in the thickness direction are not sufficient. Consequently, preferably, the openings 61b, 62b are formed with a size not affecting the thermal deformation amounts of the first adhesive part 63 and the second adhesive part 64 in the thickness direction.

Modification Example 2

Figure 11:
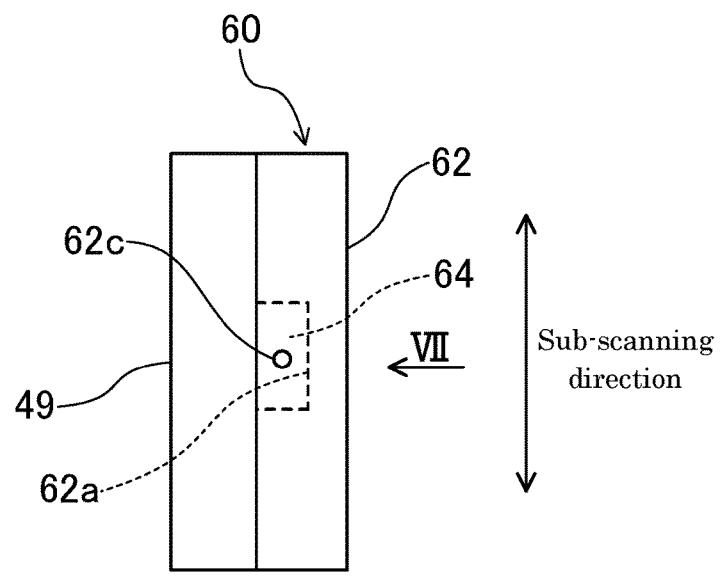
FIG. 11 is a view corresponding to FIG. 4, which illustrates a modification example 2.
Figure 12:
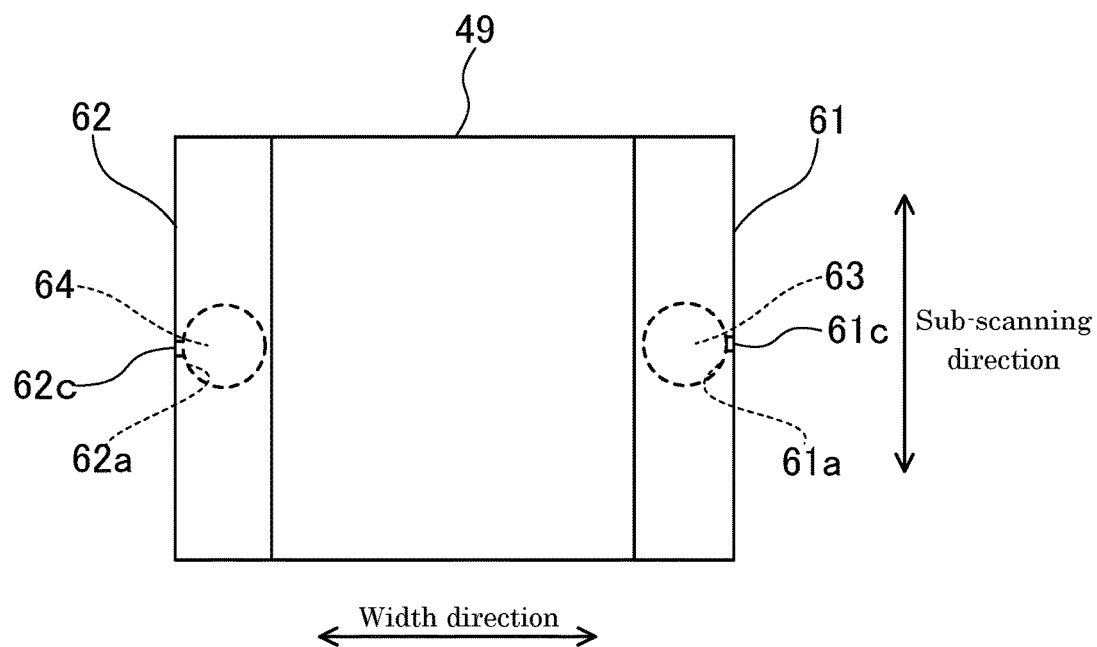
FIG. 12 is a view corresponding to FIG. 5, which illustrates a modification example 2.

FIG. 11 and FIG. 12 illustrate a modification example 1 of the present embodiment. This modification example is different from the aforementioned embodiment in that fine through holes 61c, 62c are formed at the sidewall surfaces of the first and second adhesive holding holes 61a, 62a.

Diameters of the fine through holes 61c, 62c, for example, are set to 0.5 mm to 1 mm. The fine through holes 61c,62c are configured to allow injection needles for adhesive filling to be insertable into the first and second adhesive holding holes 61a, 62a. The fine through holes 61c and 62c also serve as release holes of excessive adhesives filled in the first and second adhesive holding holes 61a and 62a. In the present modification example, since the size of the release hole is sufficiently small, when there is a change in the temperature inside the casing 40, there is no case where the thermal deformation amounts of the first adhesive part 63 and the second adhesive part 64 in the thickness direction are not sufficient.

Other Embodiments

Figure 13A:
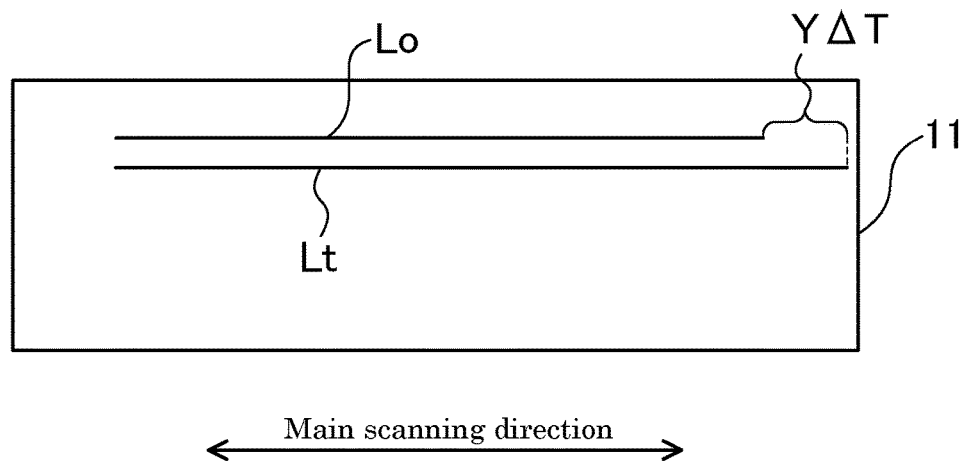
FIG. 13A is an explanation view illustrating a scanning position of light beams on a surface of a photosensitive drum, and is a view illustrating an example when using a conventional optical scanning device having no correction mechanism (a view corresponding to FIG. 8).
Figure 13B:
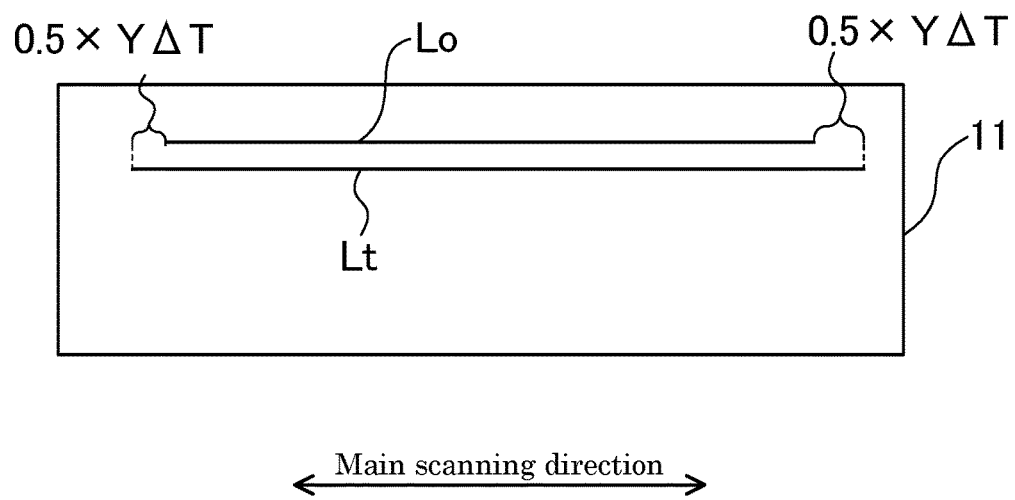
FIG. 13B is a view corresponding to FIG. 8B, which illustrates another embodiment.

The aforementioned embodiment has described an example of correcting shift of a writing start position of scanning light on the surface of the photosensitive drum 11 due to the temperature increase of the casing 40 as illustrated in FIG. 8A and FIG. 8B; however, an example as illustrated in FIG. 13A and FIG. 13B can also be considered. FIG. 13A is an example of the related art in which the correction mechanism 60 is not provided. In this example, a scanning width (a length in the main scanning direction) of light beams on the surface of the photosensitive drum 11 is increased due to the temperature increase of the casing 40. Writing of image data to the photosensitive drum is started with the detection time of the light beams by the synchronization detection sensor 50. Therefore, shift (YΔT) of a writing position due to the widening of the scanning width occurs at a writing end side. In such a case, as illustrated in FIG. 13B, it is sufficient if the rotation angle θ of the synchronization detection mirror 49 is decided such that the position shift amount YΔT is equally assigned to the writing start side and end side of the light beams. Specifically, it is sufficient if the left side of Equation (4) above is replaced with 0.5YΔT and the following Equation (6) is satisfied.

$$0.5Y\Delta T = X \tan(2 \arctan((Z2-Z1)\times(1+\alpha\Delta T))/W \qquad (6)$$

Figure 14:
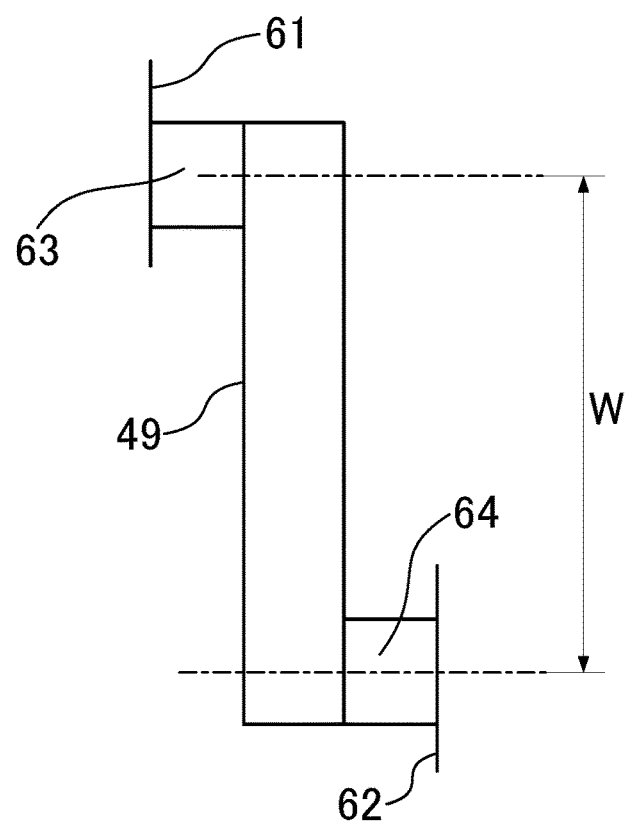
FIG. 14 is a view corresponding to FIG. 6A, which illustrates another embodiment.

Furthermore, in the aforementioned embodiment, the first adhesive part 63 and the second adhesive part 64 are all provided to the rear surface side of the synchronization detection mirror 49; however, the first adhesive part 63 and the second adhesive part 64 may be provided to a reflection surface side. Furthermore, as illustrated in FIG. 14, the first adhesive part 63 may be provided to the reflection surface side of the synchronization detection mirror 49 and the second adhesive part 64 may be provided to the rear surface side of the synchronization detection mirror 49. According to this, the sum of the thermal deformation amounts of the first adhesive part 63 and the second adhesive part 64 in the thickness direction is converted into a rotation amount of the synchronization detection mirror 49. Consequently, it is possible to sufficiently rotate the synchronization detection mirror 49 with a small amount of adhesive. Thus, the use amount of adhesive is reduced, so that reduced cost can be achieved.

What is claimed is:

1. An optical scanning device comprising:
   a casing;
   a light source;
   a deflector provided in the casing to deflect light beams emitted from the light source;
   a synchronization detection mirror that reflects the light beams reflected from the deflector;
   a synchronization detection sensor that outputs a synchronization signal when the light beams reflected by the synchronization detection mirror are incident;
   a writing control unit that starts writing of image data by the light source when a predetermined time passes after the signal from the synchronization detection sensor is received; and
   a correction mechanism that rotates the synchronization detection mirror by a predetermined angle around a sub-scanning axis in accordance with a change in temperature inside the casing, thereby correcting position shift of a written image,
   wherein the correction mechanism comprises:
   a fixing support part provided to the casing and fixing the synchronization detection mirror thereto; and
   a first adhesive part and a second adhesive part respectively provided at one end side and the other end side of the synchronization detection mirror in a width direction perpendicular to a sub-scanning direction and serving as adhesives for allowing the synchronization detection mirror to adhere to the fixing support part,
   wherein the correction mechanism is configured to rotate the synchronization detection mirror around the sub-scanning axis due to a difference between of thermal deformation amounts of the first adhesive part and the second adhesive part in a thickness direction when the temperature inside the casing has changed.

2. The optical scanning device of claim 1, wherein the first adhesive part and the second adhesive part are respectively provided at one side end part and the other end part of the synchronization detection mirror in the width direction and at a center part of the synchronization detection mirror in the sub-scanning direction.

3. The optical scanning device of claim 1, wherein, when a thickness of the first adhesive part is set to Z1, a thickness of the second adhesive part is set to Z2, and a distance between centers of the first adhesive part and the second adhesive part is set to W, Equation below is satisfied, $$Y\Delta T = X \tan(2 \arctan((Z2-Z1) \times (1+\alpha\Delta T))/W$$

in Equation above, Y denotes a position shift amount of the light beams in a main scanning direction generated when the temperature inside the casing has changed by unit temperature in a case where the correction mechanism is not provided, α denotes a linear expansion coefficient of the first adhesive part and the second adhesive part, and ΔT denotes a temperature change amount of the casing.

4. The optical scanning device of claim 1, wherein the fixing support part is formed with a first adhesive holding hole in which the adhesive constituting the first adhesive part is filled and held and a second adhesive holding hole in which the adhesive constituting the second adhesive part is filled and held, and parts of sidewall surfaces of the first and second adhesive holding holes are cut off and opened at a radial outside.

5. The optical scanning device of claim 1, wherein the fixing support part is formed with a first adhesive holding hole in which the adhesive constituting the first adhesive part is filled and held, and a second adhesive holding hole in which the adhesive constituting the second adhesive part is filled and held, and sidewall surfaces of the first and second adhesive holding holes are formed with fine through holes that pass through to a radial outside and allow injection needles for adhesive filling to be insertable into the first and second adhesive holding holes.

6. An image forming apparatus comprising the optical scanning device of claim 1.

\* \* \* \* \*